United States Patent
Sixbey et al.

(10) Patent No.: US 8,368,977 B2
(45) Date of Patent: Feb. 5, 2013

(54) METHOD OF CREATING 4X4 LUTS USING A SOURCE AND DESTINATION ICC PROFILE

(75) Inventors: Mark A. Sixbey, Walworth, NY (US); Michael Sanchez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1004 days.

(21) Appl. No.: 11/373,740

(22) Filed: Mar. 9, 2006

(65) Prior Publication Data

US 2007/0211268 A1 Sep. 13, 2007

(51) Int. Cl.
*H04N 1/46* (2006.01)

(52) U.S. Cl. ........ 358/504; 358/500; 358/515; 358/518; 382/162; 382/167

(58) Field of Classification Search ................... 358/1.1, 358/1.9, 3.01, 3.23, 504, 515, 518, 523, 500; 382/162, 167
See application file for complete search history.

(56) References Cited

U.S. PATENT DOCUMENTS

| | | | |
|---|---|---|---|
| 5,270,808 A | 12/1993 | Tanioka | 358/527 |
| 5,787,193 A | 7/1998 | Balasubramanian | 382/167 |
| 6,281,984 B1 * | 8/2001 | Decker et al. | 358/1.9 |
| 6,360,007 B1 | 3/2002 | Robinson et al. | 382/162 |
| 6,362,808 B1 * | 3/2002 | Edge et al. | 345/601 |
| 6,525,721 B1 | 2/2003 | Thomas et al. | 345/341 |
| 6,529,291 B1 | 3/2003 | Schweid et al. | 358/1.9 |
| 6,642,931 B1 * | 11/2003 | Haikin et al. | 345/601 |
| 6,707,938 B2 | 3/2004 | De Queiroz et al. | 382/162 |
| 6,867,883 B1 | 3/2005 | Cholewo et al. | 358/1.9 |
| 7,199,900 B2 * | 4/2007 | Ogatsu et al. | 358/1.9 |
| 7,742,058 B2 * | 6/2010 | Mahy et al. | 345/590 |
| 2004/0196475 A1 * | 10/2004 | Zeng et al. | 358/1.9 |
| 2005/0024656 A1 * | 2/2005 | Takahashi et al. | 358/1.9 |
| 2006/0028665 A1 * | 2/2006 | Kawai | 358/1.9 |
| 2006/0152745 A1 * | 7/2006 | Sanger | 358/1.9 |

* cited by examiner

*Primary Examiner* — King Poon
*Assistant Examiner* — Lawrence Wills
(74) *Attorney, Agent, or Firm* — Tuesday A. Kaasch; Luis M. Ortiz; Kermit D. Lopez

(57) ABSTRACT

A 4×4 LUT comprises a K to K LUT merged with a CMYK to CMYK LUT with values ranging from [0, 0, 0, 0] to [0, 0, 0, 255], said 4×4 LUT written to a known file format. A method for creating 4×4 look up tables (LUTs) uses the source and destination ICC profiles. A K to K LUT is built, a CMYK to CMYK LUT is built, the K to K LUT is merged with the CMYK to CMYK LUT, and the resulting LUT is written to a known file format. Such a process is important since it solves the issue of preserving K in a CMYK to CMYK transform while adding the performance improvement of a 4×4 LUT.

5 Claims, 7 Drawing Sheets

METHOD OF CREATING 4X4 LUTS USING A SOURCE AND DESTINATION ICC PROFILE

TECHNICAL FIELD

Embodiments are generally related to the general subject matter of color image processing. Embodiments are also related to the field of raster image processing (RIP). Embodiments are additionally related to a method of creation of 4×4 look up tables (LUTs).

BACKGROUND OF THE INVENTION

Many processes and devices have been used for color image processing and rely on a technique of creating look up tables (LUTs) to produce images on a passive or active display medium, such as paper or an electronic screen. In the printing of color images many customers use custom CMYK International color consortium (ICC) profiles as the source space for their documents. This allows them to emulate other presses on photocopier devices. The main problem with doing this is that during the CMYK to profile connection space (PCS) to CMYK translation, K only data is converted to CMYK. In addition, the customer is subject to a performance hit each time the ICC path is used. Prior to this invention, the customer would have to create a device link profile. Unfortunately, not all raster image processor (RIP) support device link profiles. Thus, a solution may not exist for some customers.

The generation of color documents can be thought of as a two step process: first, the generation of the image by means of scanning an original document with a color image input terminal or scanner or, alternatively, creating a color image on a work station operated in accordance with a color image creation program; and secondly, printing of that image with a color printer in accordance with the colors defined by the scanner or computer generated image.

Photo electronic scanning of a color image typically produces a separation of that image into red, green, and blue components which are output as RGB signals. In order to produce such an image in printed form, the RGB signal must be converted into a CMYK signal which can be read by suitable color printing apparatus. For scanning from a hardcopy original, the original calorimetric signals derived from the hard-copy image are typically in a red-green-blue (RGB) color space; however, most general purpose color printing apparatus, whether electrostatographic or otherwise, require that the calorimetric signal be applied to cyan-magenta-yellow (CMY) or cyan-magenta-yellow-black (CMYK) color space. Most full-color xerographic printers, for example, have supplies of cyan, magenta, yellow, and black toner, that are applied to different portions of an image to obtain subtle gradations of color in the visible spectrum.

An example of prior art of color image processing is disclosed in U.S. Pat. No. 5,787,193 by Balasubramanian entitled "System for converting color image signals from RGB to CMY color spaces through look-up tables" describes a system for converting RGB color signals to CMY or CMYK color signals, such as to operate a color printing apparatus, and utilizes three separate electronic look-up tables. Each look-up table allows inputs of RGB signals, which are applied to a three-dimensional space. Each point in the space represents an output for one CMY color signal, and each look-up table is dedicated to one CMY color output. Each look-up table emphasizes one particular RGB color by providing a higher resolution of inputs along the axis for that color. FIG. 1 illustrates a diagram of a prior-art system 100 for converting color image signals from RGB to CMY color spaces through look-up tables. FIG. 2 illustrates an example 200 of the locations of outputs in color space according to the prior-art system 100 shown in FIG. 1.

Another example of a prior art of color image processing is disclosed in U.S. Pat. No. 5,270,808 to Tanioka, which published on Dec. 14, 1993 and is entitled "Color image processing with adjustment of computed recording color to match original color". It describes a color image processing method and apparatus therefore, in which the input image data are converted into a color coordinate system represented by luminosity and hue, for example L*a*b* space. The colors reproducible on the output device, for example a printer, are also converted into this coordinate system. An average value is calculated over plural pixels in the vicinity of an object pixel to be digitized, and plural average values are then obtained by including the object pixel selected at each of the reproducible colors. The input image signal is digitized to the closest one of the plural average signals. The digitization error generated upon digitization is distributed to the succeeding pixels with weighted ratios. This method achieves faithful color reproduction, matching the colors reproducible on the recording or display device. What are still needed are improved methods or systems for color translation.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data processing method.

It is another aspect of the present invention to provide for an improved color image processing method, which can easily be done at a RIP time with very small one time performance hit.

It is a further aspect of the present invention to provide a method for creating 4×4 LUTs using a source and destination icc profile in accordance with color image processing.

The aforementioned aspects and other objectives and advantages can now be achieved as described herein. The invention is related with the process of creating the 4×4 LUT using a source and a destination ICC profile. Customers can emulate different devices through the use of CMYK ICC profiles which do not always work well with k-only data. The LUT is created by first building an array of 0, 0, 0, K color samples ranging from 0, 0, 0, 0 to 0, 0, 0, 255. This data is then passed through the source ICC to yield L*a*b*. Likewise, the same data is passed through the destination profile to also yield L*a*b*. The code then matches source L*a*b* along LUT node boundaries to derive a LUT table for K to K transformation. The system is then enabled to create a grid of CMYK colors along the node boundaries. The grid is passed through the source ICC and the destination ICC to create the CMYK to CMYK transform. As a final step, the K to K nodes then replace the K only nodes in the output LUT table. At that point, the LUT can be translated into whatever file format is needed for the RIP. The method of forming the 8 Bit resolution k matching can be substantially more accurate for k preservation color matching than the simple pass of the source color through the destination profile.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
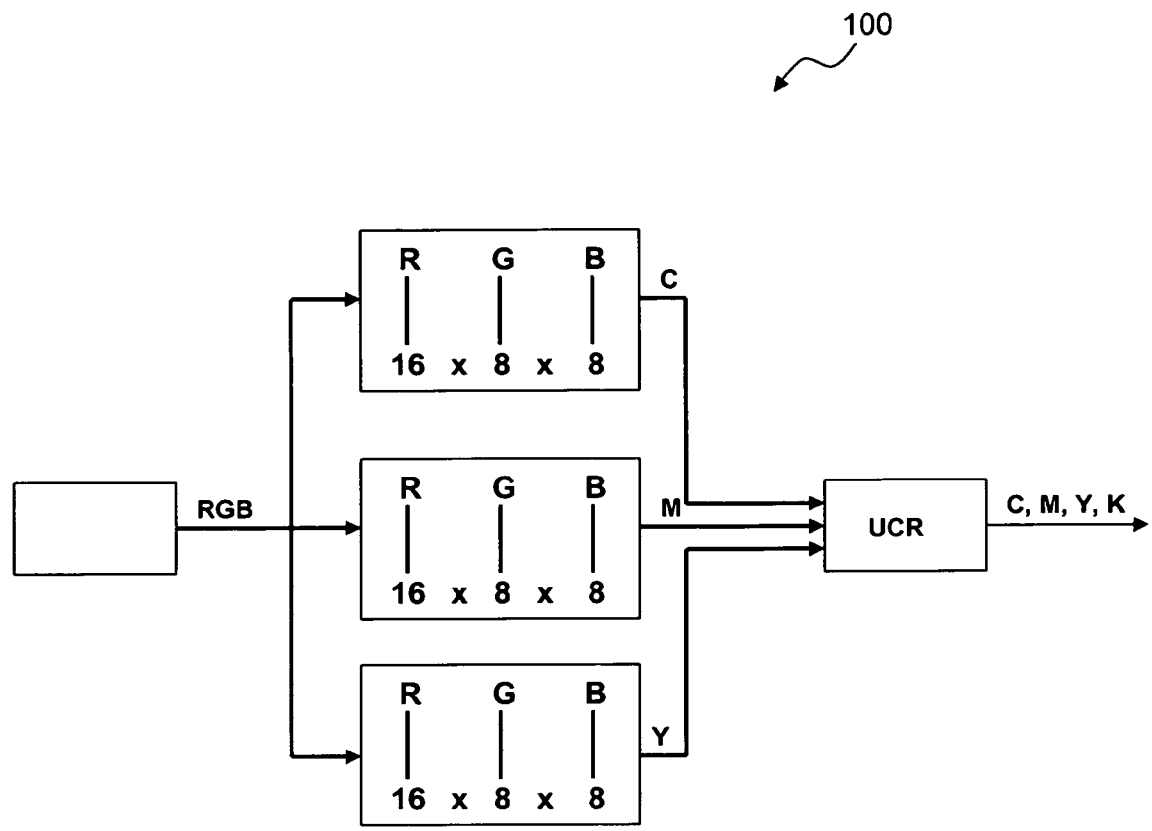
FIG. 1 illustrates a diagram of a prior-art system for converting color image signals from RGB to CMY color spaces through look-up tables.
Figure 2:
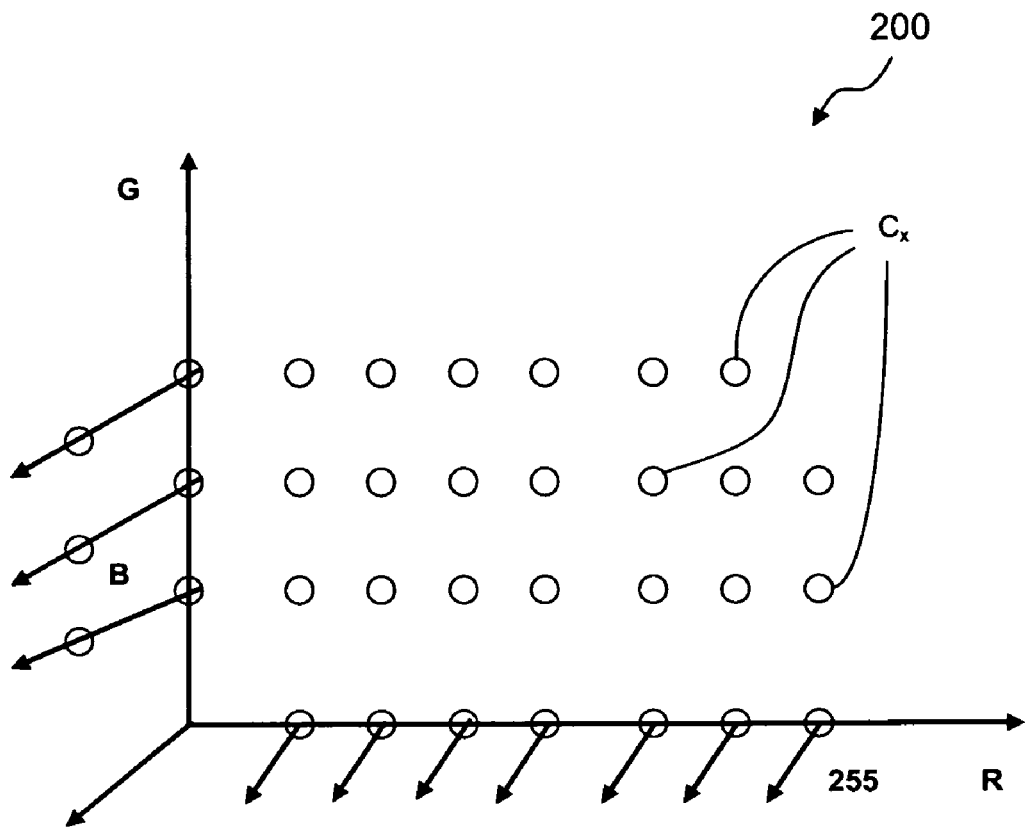
FIG. 2 illustrates an example of the locations of outputs in color space according to the prior-art system depicted in FIG. 1.
Figure 3:
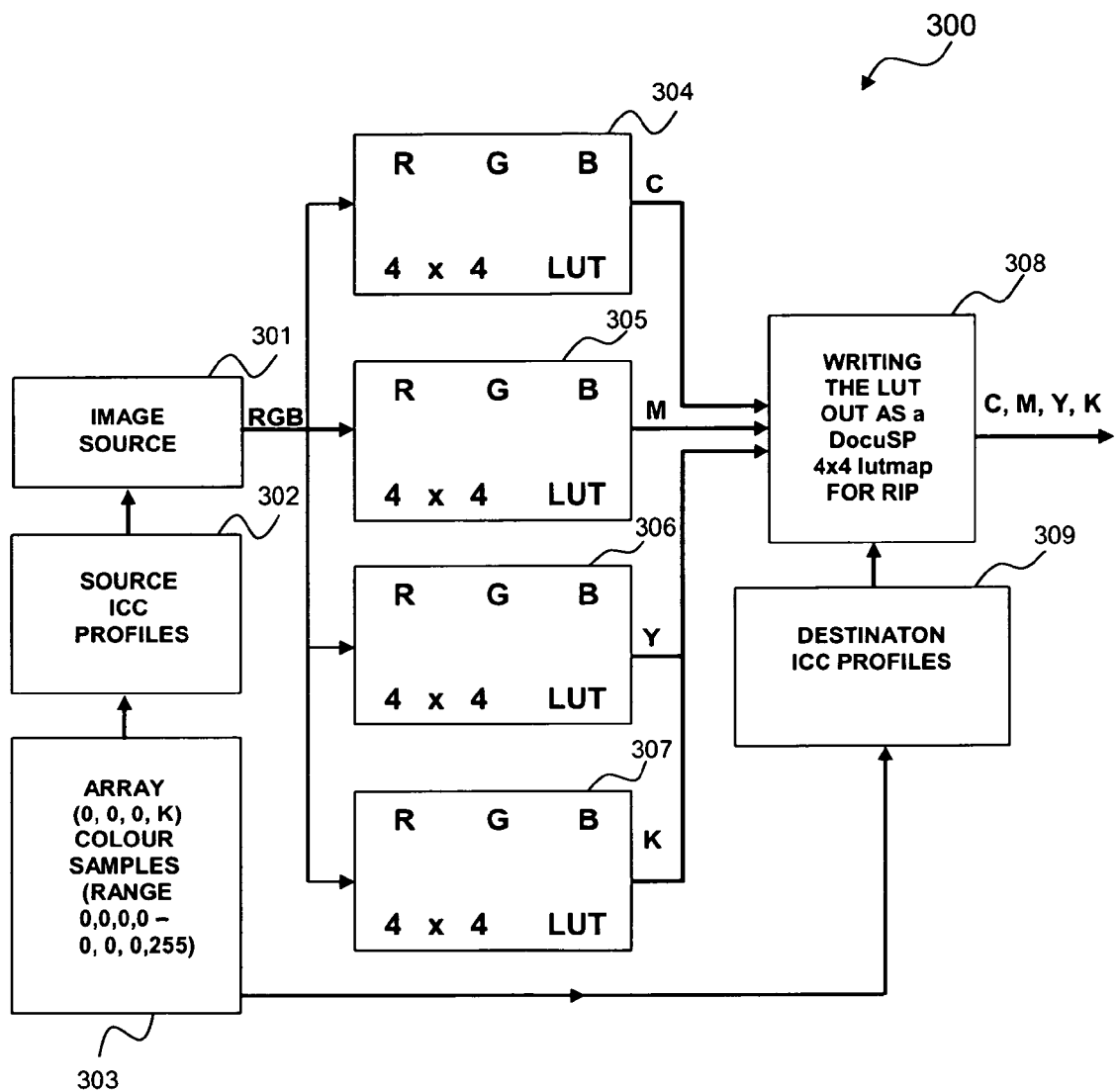
FIG. 3 illustrates a system view of an arrangement of 4×4 look-up tables (LUTs), for creating 4×4 LUTs using a source and destination ICC profile in accordance with a preferred embodiment.

Referring to FIG. 3, a system view is illustrated of an arrangement of 4×4 look-up tables (LUTs), for creating 4×4 LUTs using a source and destination ICC profile in accordance with a preferred embodiment. System 300 includes the image source 301 that incorporates the use of the CMYK array values with the range (0, 0, 0, 0 to 0, 0, 0, 255) 303 are passed backwards through both the source 302 and destination ICC profiles 309. The RGB signals are send to each of the lookup tables (LUTs) 304, 305, 306, and 307. Each look-up table produces an output in response to a combination of RGB signal applied thereto. The output signal will be formed in the combination of CMYK signals, which includes the configuration of the destination ICC profiles and thereby writing the LUT to a known file format as a 4×4 LUT map for RIP 308.

Figure 4:
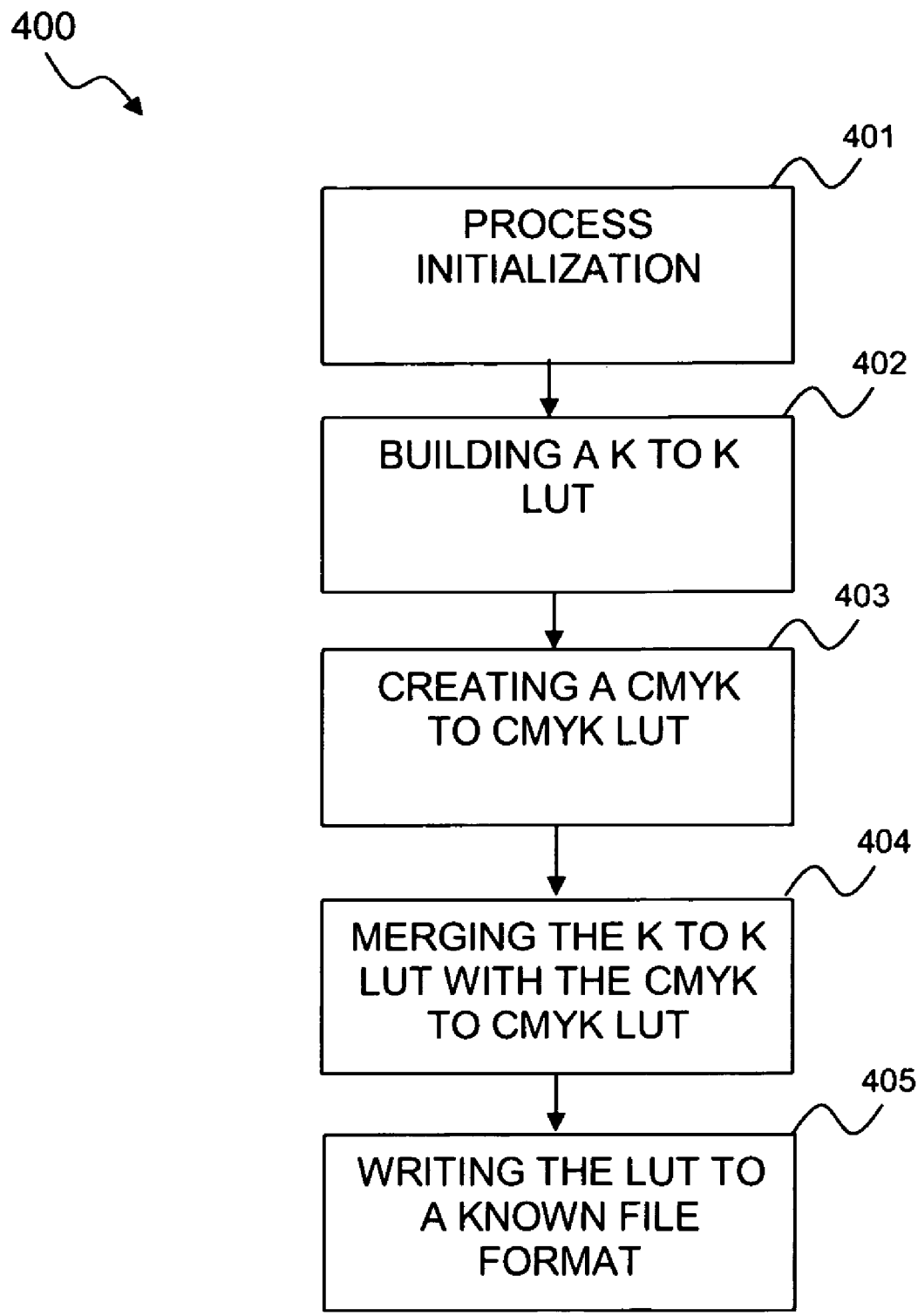
FIG. 4 illustrates a high-level flow chart of the basic process for creating LUT entails for 4×4 LUTs using a source and destination ICC profiles in accordance with a preferred embodiment.

Referring to FIG. 4, a flow chart 400 illustrates the basic process for creating LUT entails for 4×4 LUTs using a source and destination ICC profiles in accordance with a preferred embodiment. As indicated at block 401, the process is initialized. Thereafter, as indicated at block 402, building a K to K LUT can be established. Next, as indicated at block 403, creating a CMYK to CMYK LUT, after that merging the K to K LUT with the CMYK to CMYK LUT and then writing the LUT to a known file format 404.

Figure 5:
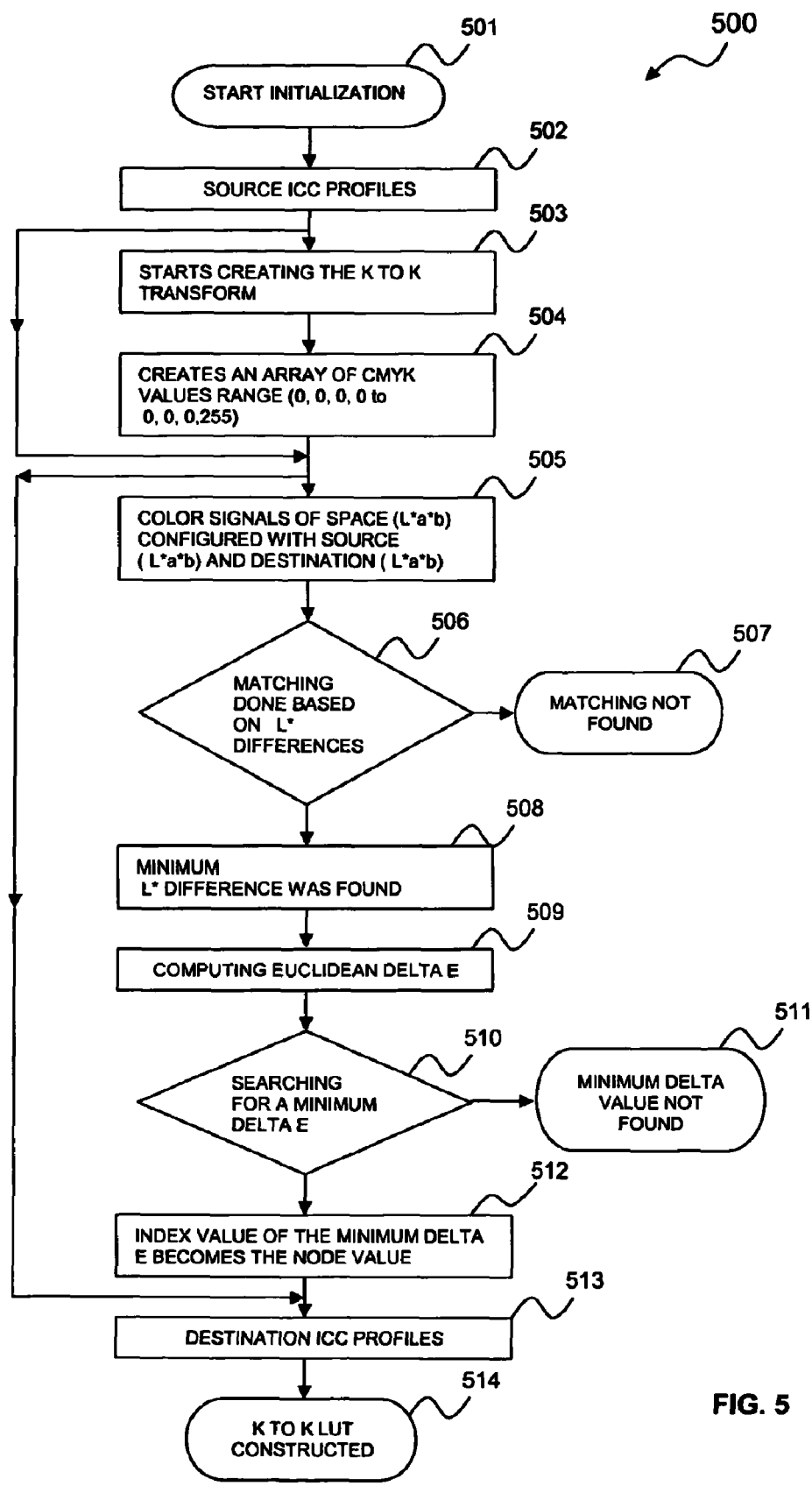
FIG. 5 illustrates a high-level flow chart of operations depicting logical operational steps, for forming K to K LUT for creating 4×4 LUTs using a source and destination ICC profiles, in accordance with a preferred embodiment.

Referring to FIG. 5, a flow chart 500 illustrates logical operational steps for forming K to K LUT for creating 4×4 LUTs using a source and destination ICC profiles, in accordance with a preferred embodiment. As indicated at block 501, the process is initialized. Thereafter as indicated at block 502 the source ICC profile are configured and thereby starts creating the K to K transform 503. Then, as indicated at block 504, creating an array of CMYK values ranging from 0, 0, 0, 0 to 0, 0, 0, 255. These values are passed backwards through both the source ICC profile 502 and the destination ICC profile as described in block 513, yielding CMYK to L*a*b* that are the color signals of space that is based on the node boundary condition that can be configured with the source L*a*b and the destination L*a*b as indicated in block 505.

Next as indicated at block 514, matching should be done by first matching based on L* differences 506 and the condition is checked for proper matching to take place as indicated at block 507. Once a minimum L* difference was found, as depicted in block 508, the process then computed Euclidean Delta E 509 between the source and destination L*a*b* values and searched for a minimum Delta E 510 and the condition is checked each time for getting the value indicated at block 511. Once found, the index of the minimum Delta E became the node value at block 512 of the current search thereby constructing the K to KLUT as depicted at block 514.

Figure 6:
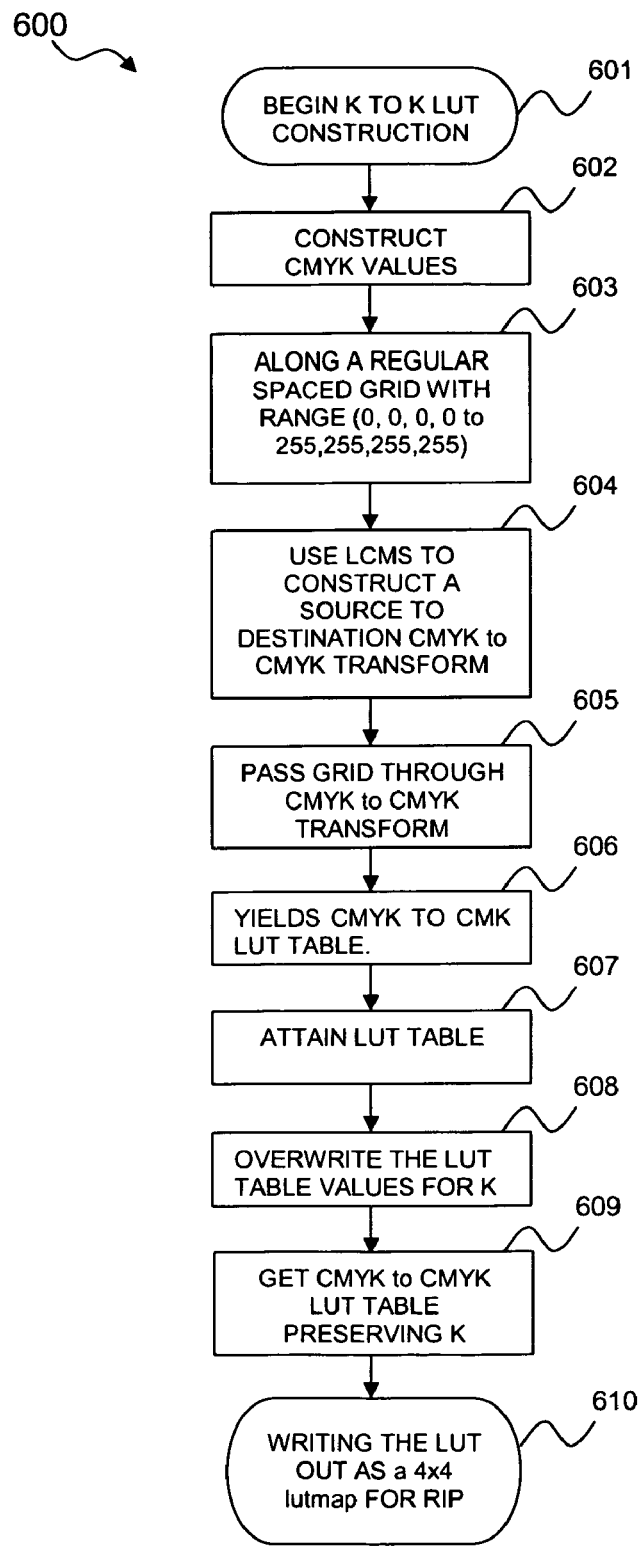
FIG. 6 illustrates a high-level flow chart of operations depicting logical operational steps, for forming the LUT with 4×4 LUTs using a source and destination ICC profiles in accordance with a preferred embodiment.

Referring to FIG. 6, a flow chart 600 illustrates logical operational steps, for forming the final LUT with 4×4 LUTs using a source and destination ICC profiles in accordance with a preferred embodiment. After the K to K LUT is constructed as indicated in block 601, the next step is to construct CMYK values as described in block 602 along a regularly spaced grid that range from 0, 0, 0, 0 to 255, 255, 255, 255 at block 603. These values are created using the same node spacing as described in the K to K LUT. Then, as indicated at block 604, uses Little Color Management System (LCMS) to construct a source to destination CMYK to CMYK transform.

Thereafter, as described at block 605, the grid is then passed through the CMYK to CMYK transform to yield the CMYK to CMYK LUT table as indicated at block 606. Once attaining the LUT table depicted at block 607, and thereby overwriting the LUT table values for K only source data (0, 0, 0, 0 to 0, 0, 0, 255) with the K to K table created in the previous step as described at block 608 and now forming CMYK to CMYK LUT table which preserves K as depicted at block 609. Finally the LUT table is written into a format that can be read and understood by the RIP that is to a DocuSP 4×4 lutmap as depicted at block 610.

Figure 7:
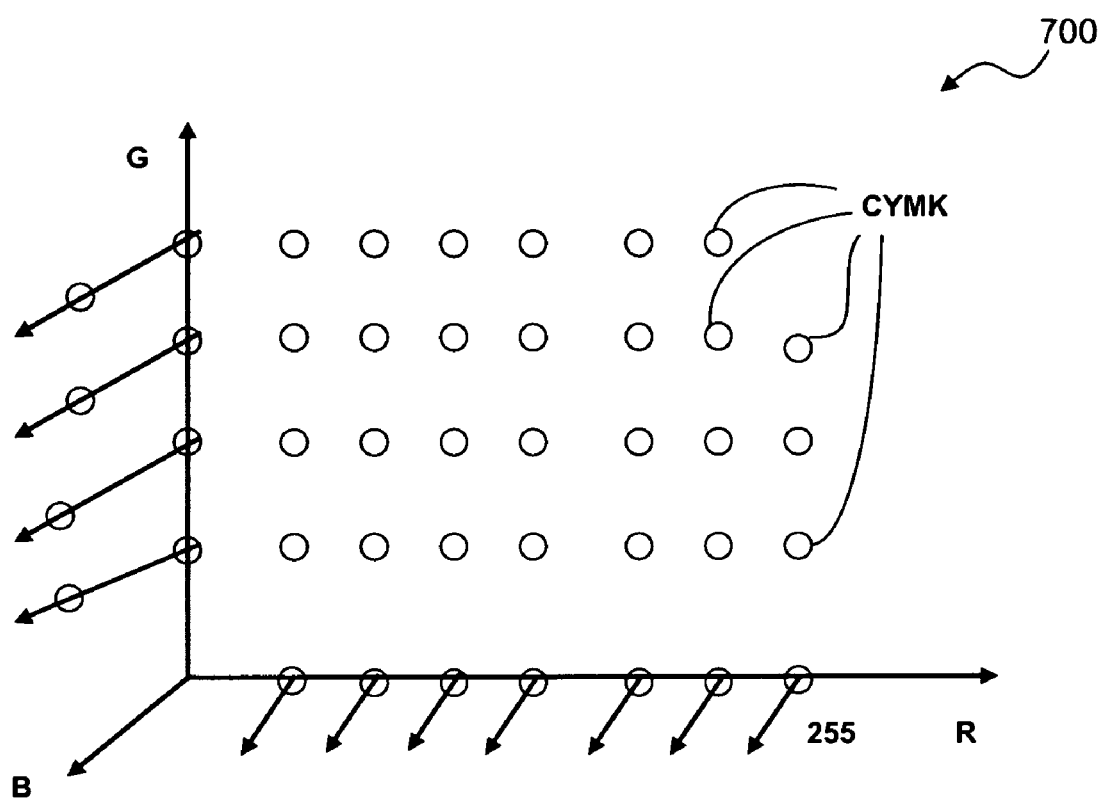
FIG. 7 illustrates the graphical representation in color space, the location of outputs relative to input variables for particular look-up tables (LUTs) according to the present invention.

Referring to FIG. 7, a graphical representation 700 illustrates, in color space, the location of outputs relative to input variables for particular look-up tables (LUTs) according to the present invention. The output is represented by the dots.

It should be appreciated that the method of forming the 8 Bit resolution k matching can be substantially more accurate for k preservation color matching than the simple pass of the source color through the destination profile.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for creating 4×4 LUTs without use of a device link profile, comprising the steps of:

building a K to K LUT having a particular node spacing, wherein said K to K LUT is constructed by:
creating a K to K transform;
creating an array of CMYK values ranging from [0, 0, 0, 0] to [0, 0, 0, 255];
passing said array backwards through a source ICC profile and a destination ICC profile to yield a source L*a*b and a destination L*a*b;

matching said source L*a*b and said destination L*a*b based on a minimum L* difference; and determining a minimum Delta E between said source L*a*b and said destination L*a*b, wherein said minimum Delta E is used as a node value to construct said K to K LUT;

constructing CMYK values along a regularly spaced grid ranging from [0,0,0,0] to [255,255,255,255] utilizing the particular node spacing of said K to K LUT;

creating a CMYK to CMYK LUT by passing said regularly spaced grid through a CMYK to CMYK transform wherein LCMS is used to construct a source to destination CMYK to CMYK transform;

merging the K to K LUT with the CMYK to CMYK LUT to create a 4×4 LUT; and writing the 4×4 LUT to a known file format;

said method being executed without use of a device link profile at RIP time within a color rendering device to optimize code for performance.

2. The method of claim 1, wherein after the 4×4 LUT table is constructed, the 4×4 LUT table values can be overwritten for K only source data ([0, 0, 0, 0] to [0, 0, 0, 255]) with the CMYK to CMYK LUT.

3. A method for creating a 4×4 LUT without use of a device link profile comprising the steps of:

a) building a K to K LUT having a particular node spacing by creating the K to K transform, wherein creating said K to K transform comprises: creating an array of CMYK values ranging from [0, 0, 0, 0] to [0, 0, 0, 255]; passing said array backwards through a source ICC profile and a destination ICC profile to yield a source L*a*b and a destination L*a*b; matching said source L*a*b and said destination L*a*b based on a minimum L* difference; and determining a minimum Delta E between said source L*a*b and said destination L*a*b, wherein said minimum Delta E is used as a node value to construct said K to K LUT;

b) constructing CMYK values along a regularly spaced grid ranging from [0,0,0,0] to [255,255,255,255] utilizing the particular node spacing of said K to K LUT;

c) creating a CMYK to CMYK LUT by passing said regularly spaced grid through a CMYK to CMYK transform;

d) merging the K to K LUT with the CMYK to CMYK LUT by passing said grid backwards through the source ICC profile and the destination ICC profile;

writing a 4×4 LUT resulting from steps (a) through (d) to a known file format wherein said 4×4 LUT is executed without use of a device link profile and at RIP time within a color rendering device to optimize code for performance.

4. The method of claim 3, wherein after the 4×4 LUT is constructed, the 4×4 LUT result values are overwritten for K only source data ([0, 0, 0, 0] to [0, 0, 0, 255]) with the CMYK to CMYK LUT.

5. A non-transitory computer-usable medium for creating a 4×4 LUT without use of a device link profile, said computer-usable medium embodying computer program code, said computer program code comprising computer executable instructions configured for:

building a K to K LUT having a particular node spacing, wherein said K to K LUT is constructed by:

creating a K to K transform;

creating an array of CMYK values ranging from [0, 0, 0, 0] to [0, 0, 0, 255 ];

passing said array backwards through a source ICC profile and a destination ICC profile to yield a source L*a*b and a destination L*a*b;

matching said source L*a*b and said destination L*a*b based on a minimum L* difference; and determining a minimum Delta E between said source L*a*b and said destination L*a*b, wherein said minimum Delta E is used as a node value to construct said K to K LUT;

constructing CMYK values along a regularly spaced grid ranging from [0,0,0,0] to [255,255,255,255] utilizing the particular node spacing of said K to K LUT;

creating a CMYK to CMYK LUT by passing said regularly spaced grid through a CMYK to CMYK transform wherein LCMS is used to construct a source to destination CMYK to CMYK transform;

merging the K to K LUT with the CMYK to CMYK LUT to create a 4×4 LUT; and writing the 4×4 LUT to a known file format;

said method being executed without use of a device link profile and at RIP time within a color rendering device to optimize code for performance.

* * * * *